United States Patent
Eilken et al.

(10) Patent No.: US 9,205,909 B2
(45) Date of Patent: Dec. 8, 2015

(54) AIRCRAFT DOOR ARRANGEMENT

(71) Applicant: Airbus Operations GmbH, Hamburg (DE)

(72) Inventors: Wolfgang Eilken, Hamburg, DE (US); Stefan Tacke, Moisburg (DE); Simone Ruether, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 46 days.

(21) Appl. No.: 14/165,048

(22) Filed: Jan. 27, 2014

(65) Prior Publication Data

US 2014/0209747 A1 Jul. 31, 2014

Related U.S. Application Data

(60) Provisional application No. 61/758,560, filed on Jan. 30, 2013.

(30) Foreign Application Priority Data

Jan. 30, 2013 (EP) ..................................... 13153299

(51) Int. Cl.
*B64C 1/14* (2006.01)
(52) U.S. Cl.
CPC .............. *B64C 1/1461* (2013.01); *B64C 1/1407* (2013.01); *B64C 1/1415* (2013.01)
(58) Field of Classification Search
CPC ...................................................... B64C 1/1407
USPC ............................................ 244/129.4, 129.5
See application file for complete search history.

(56) References Cited

U.S. PATENT DOCUMENTS

| 4,186,901 A | 2/1980 | Shorey |
| 4,497,462 A * | 2/1985 | Hamatani .................. 244/129.5 |

(Continued)

FOREIGN PATENT DOCUMENTS

| CN | 201136592 Y | 10/2008 |
| CN | 101522519 A | 9/2009 |
| EP | 0876954 A2 | 11/1998 |

OTHER PUBLICATIONS

European Search Report for Application No. 13153299.6-1753 dated Aug. 20, 2013.

(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

An aircraft door arrangement having a pivotable door for closing an aperture in the fuselage of an aircraft and selectively movable between closed and open positions by a linear actuating mechanism having a casing and a rod selectively extendable and retractable. An actuator mounting mounts the casing between two elements of the primary structure of the aircraft. The rod is pivotally coupled to the door. The actuator mounting includes a rigid mounting component including three legs extending in a common plane together with the casing and the rotation axis and each having a first and a second longitudinal end. The first and second legs symmetrically extend from the casing at an angle at opposite sides thereof. Each of the second ends of the first and second legs is rotatably coupled on the rotation axis to another one of the spaced elements of the primary structure of the aircraft.

15 Claims, 3 Drawing Sheets

(56) References Cited

U.S. PATENT DOCUMENTS

| | | | |
|---|---|---|---|
| 4,510,714 A | 4/1985 | Kasper et al. | |
| 5,931,415 A | 8/1999 | Lingard et al. | |
| 6,457,675 B1 * | 10/2002 | Plude et al. | 244/129.5 |
| 8,074,930 B2 * | 12/2011 | Sibley | 244/129.5 |
| 8,141,816 B2 * | 3/2012 | Robbins et al. | 244/53 B |

OTHER PUBLICATIONS

Chinese Office Action for Application No. 2014/10040312.5 dated Aug. 18, 2015.

* cited by examiner

AIRCRAFT DOOR ARRANGEMENT

CROSS-REFERENCE TO RELATED APPLICATIONS

This application claims priority to and the benefit of European Patent Application Serial No. EP 13153299.6 and to U.S. Provisional Application Ser. No. 61/758,560, both of which were filed on Jan. 30, 2013, the entire disclosures of which are both incorporated by reference herein.

TECHNICAL FIELD

The present invention relates to an aircraft door arrangement or system comprising a door hingedly mounted to the fuselage of an aircraft such that it is selectively pivotally movable about the corresponding hinge into a closed position, in which it closes an aperture in the fuselage and is generally flush with a skin of the fuselage, and into an open position, in which it provides access through the aperture to the interior of the fuselage. Such doors are typically constructed such that the hinge is disposed at the upper edge of the door, frequently oriented in the longitudinal or flight direction of the aircraft.

For opening and closing the door such a door arrangement commonly comprise a linear actuating mechanism or linear actuator which is arranged and adapted such that it can be operated to selectively move the door between its open position and its closed position. For this purpose, the linear actuating mechanism comprises an elongate straight casing and a rod which is disposed in a longitudinal bore formed in the casing. The rod extends partially from one of the two longitudinal ends of the casing, and the linear actuating mechanism is operable to selectively further extend the rod from the casing and to retract the rod further into the casing. Thus, the linear actuating mechanism may, in particular, be or comprise a known pneumatic or hydraulic actuator, but also a known electrical linear actuator.

The casing of the linear actuating mechanism is supported by an actuator mounting which mounts the casing between two spaced elements of the primary structure of the aircraft. In this manner, the casing is supported by two spaced elements via the actuator mounting. The mounting is effected such that the casing is pivotable about a rotation axis, which is typically parallel to the axis defined by the hinge of the door.

The longitudinal end of the rod extending from the casing, i.e. the longitudinal end remote from the casing at least when the rod is fully or partially extended, is pivotally coupled to the door. For coupling purposes the end of the rod may comprise a suitable eye which is coupled to, e.g. a suitable door fitting. The rod is coupled to the door at a location such that, due to the fact that the casing is supported by the spaced elements of the primary structure of the aircraft and the rod is attached to the door, upon extending the rod from the casing the door is moved into its open position and upon retracting the rod into the casing the door is moved into its closed position.

In prior art door arrangements of this general type presently employed in aircrafts the casing, and typically the end of the casing opposite the end from which the rod extends, is pivotally coupled to and supported by a rigid, elongate so-called actuator fitting or beam which is rigidly coupled between two parallel and spaced cross beams, which in this case constitute the spaced elements of the primary structure of the aircraft. This is illustrated in FIG. 1, which schematically shows a prior art door arrangement of the above type.

In FIG. 1 an elongate beam 1, which is the actuator fitting, is attached at both of its ends to a respective one of the two cross beams 2. The attachment is such that the beam 1 is rigidly coupled to the cross beams 2, i.e. no relative translational or rotational movement is possible. A linear actuator 3 comprises a casing 4 and a rod 5 extending from the longitudinal end 6 of the casing 4. Using suitable operation (not shown), such as hydraulic or pneumatic operation, the rod 5 can be further extended from or retracted again into the casing 4 in the longitudinal direction of the casing 4 and the rod 5, i.e. in the direction of the arrow 7 oriented along the y direction defined by the coordinate system 8.

An end portion 8 of the casing 4 is coupled to a bearing 9 rigidly attached to the beam 1 in the middle between the two cross beams 2, such that the casing 4 is able to pivot about the rotation axis 10. On the other hand, an eye 11 provided at the end of the rod 5 remote from the casing 4 is coupled to a bearing 12 rigidly attached to the door 13, such that the door 13 and the rod 5 are able to pivot with respect to each other about the rotation axis 14, which is parallel to the rotation axis 10.

In FIG. 1 the door 13 is shown in its closed position, in which the door 13 extends perpendicularly to the plane of the drawing. By extending the rod 5, the door 13 can be pivoted about the rotation axis 15, which is parallel to both the rotation axis 10 and the rotations axis 14, into the open position (not shown). In this process, the door 13 and the rod 5 pivot with respect to each other about the rotation axis 14, and the casing 4 pivots about the rotation axis 10 with respect to the fixed beam 1.

BACKGROUND

For typical aircraft doors, such as cargo doors, the actuating forces or loads transmitted by the linear actuator 3 to the beam 1 and, thus, to be absorbed by the beam 1 and to be distributed to the cross beams 2 reach values of e.g. 11 tons. These loads do not only comprise load components acting in the y direction, which load components tend to bend the beam 1, but, due to the pivoting movement in the yz plane, also load components which transmit an angular momentum to the beam 1 and, eventually, to the cross beams 2. In other words, the actuator fitting or beam 1 is loaded by a bending force in the y direction and by a torque or torsional momentum, and the respective loads are applied at the bearing 9 of the beam 1, which bearing 9 supports the casing 4 and provides the rotation axis 10 for the casing 4.

Therefore, in order to avoid failure the actuator fitting or beam 1 must be a very massive and strong component, which is typically made of titanium and its attachment to the cross beams 2 likewise must be very strong. Meeting these requirements is costly and adds significant weight to the aircraft.

SUMMARY

It is thus an object of the present invention to provide an aircraft door arrangement which improves the load transfer to the primary structure of the aircraft, is less expensive, adds less weight and overcomes the disadvantages of the prior art.

This object is achieved by an aircraft door arrangement or system of the above general type, but comprising a different actuator mounting.

Thus, in accordance with the above description of the general type, the aircraft door arrangement comprises a door hingedly mounted to the fuselage of an aircraft such that it is selectively pivotally movable into a closed position in which it closes an aperture in the fuselage and into an open position in which it provides access through the aperture. It further comprises a linear actuating mechanism or linear actuator adapted to be operable for selectively moving the door between its open and closed positions, wherein the linear actuating mechanism comprises an elongate straight casing and a rod which is disposed in the casing and extends partially from a longitudinal end of the casing and which is selectively extendable and retractable by operating the linear actuating mechanism. Further it comprises an actuator mounting to mount the casing between and supported by two spaced elements of the primary structure of the aircraft such that it is pivotable about a rotation axis. The longitudinal end of the rod extending from the casing, i.e. the end remote from the casing when at least partially extended, is pivotally coupled to the door, e.g. via a suitable door fitting, such that upon extending the rod from the casing the door is moved into its open position and upon retracting the rod into the casing the door is moved into its closed position. For details, reference is made to the above description of the general type of aircraft door arrangement, all features of which can be provided in the present invention.

However, different from the prior art aircraft door arrangements using an actuator fitting or beam and illustrated in an exemplary manner in FIG. 1, the actuator mounting includes a rigid mounting component comprising three elongate legs or bars extending in a common plane together with the casing and the rotation axis. Each of the legs has a first and a second longitudinal end. The three elongate legs include a first leg and a second leg of equal length and shape and a third leg.

Each of the first leg and the second leg is connected with its respective first end to the casing such that the first leg and the second leg symmetrically extend at an angle away from the casing at opposite sides thereof. In this regard, as will be explained in more detail below, the first ends may be directly attached to the casing or via one or more intermediate components arranged between the first ends of the first and second legs. In any case, the connection is such that loads acting on the casing upon operating the linear actuating mechanism, i.e. actuating loads, are transferred to and along the first and second legs. Advantageously, due to the symmetric arrangement these actuating loads are distributed evenly along the first and second legs.

The first end of the third leg is connected and preferably directly attached to the second end of the first leg and the second end of the third leg is connected and preferably directly attached to the second end of the second leg, such that the third leg is connected between the second ends of the first and second legs.

From the above description of the relative arrangement it can be taken that the three legs are disposed in an arrangement identical to, generally corresponding to or generally similar to an isosceles triangle or, in case of intermediate components between the first ends of the first and second legs, an isosceles trapezoid.

Finally, each of the second ends of the first and second legs is rotatably coupled on the rotation axis to another one of the spaced elements of the primary structure of the aircraft in such a manner that the mounting component is pivotable about the rotation axis. Thus, the coupling of the second ends to the spaced elements defines the rotation axis. In other words, each of the first and second legs is rotatable with respect to the corresponding one of the spaced elements about a rotation axis which coincides with the rotation axis of the mounting component.

This construction and arrangement of the actuator mounting and the replacement of the prior art actuator fitting or beam has the advantage that the actuating loads are transferred to the spaced elements and the primary aircraft structure directly via the first and second legs, which are inclined with respect to the casing and rotatable with respect to the spaced elements, and not via the casing, the rotation axis and an actuator beam. Thus, the load transfer path is improved and disadvantageous bending and torsional moments are avoided or significantly reduced. Actually, due to the symmetric arrangement of the first and second legs no or at least only relatively small forces acting in the direction of the rotation axis are transferred by the actuator mounting to the spaced elements. Rather, only or essentially only shear forces are transmitted to the spaced elements. Further, the third leg, which stabilizes the second ends of the first and second legs, can be constructed to have significantly less strength than the prior art actuator fittings or beams. Therefore, weight and costs savings can be achieved. Further, as compared to the relatively large longitudinal end faces of the prior art actuator fittings or beams, which are rigidly attached to the spaced elements, the connection basis provided by the first and second legs and their coupling to the spaced elements is significantly smaller. Thus, potential problems with assembly tolerances are reduced and can be easier solved.

In a preferred embodiment the third leg supports the casing at a location spaced from the location at which the first ends of the first and second ends are connected to the casing. In this regard, the third leg can be rigidly connected to the casing. However, it is preferred that the third leg and the casing are floatingly connected such that they are movable with respect to each other in the longitudinal direction of the casing, possibly to a limited extend only. This avoids that bending forces are applied to the third leg, but nevertheless provides additional support for the casing. In this context, it is further preferred if some movement between the casing and the third leg in the direction perpendicular to both the longitudinal direction of the casing and the direction of the rotation axis is also possible. This may be achieved by suitably constructing the floating connection.

In a preferred embodiment the casing is connected to the third leg such that the third leg supports the casing against movement in the direction of the rotation axis. It is preferred that the support is provided in this direction only, e.g. by the floating connection mentioned above. However, a support also in a direction perpendicular to both the common plane and the rotation axis, which may also be effected by the floating connection mentioned above, or possibly also in all directions by, e.g., a rigid connection may also be provided. Due to the symmetric arrangement of the first and second legs with respect to the casing, load transfer in the direction of the rotation axis is essentially cancelled.

In any case in which the casing is connected to the third leg, the casing is preferably connected to the third leg in the middle between the first and second ends thereof. This ensures that transfer of forces acting in the direction of the rotation axis is minimized.

Generally, a minimization of forces acting in the direction of the rotation axis is achieved if the mounting component advantageously has mirror symmetry about a plane extending through the longitudinal axis of the casing and perpendicularly to the plane defined by the mounting component.

The first and second legs may be straight or curved, and/or the third leg may be straight or curved. Accordingly, all legs may be straight, all legs may be curved, the first and second legs may be straight and the third leg curved, or the first and second legs may be curved and the third leg straight. In this manner it is advantageously possible to choose, depending on the application at issue, a configuration of the actuator mounting which is most suitable for improving the load transfer and minimized weight.

The first ends of the first and second legs may be rigidly connected to the casing. For example, the first and second legs may be integrally formed in one piece with the casing. It should be noted that in addition or in the alternative it is also possible that the third leg is integrally formed in one piece with the casing. In the alternative, the first ends may also be attached to the casing by suitable attachment.

In any case, the first ends of the first and second legs may be connected directly to the casing or may be connected and separated by a coupling component which is coupled to the casing and which may, by itself, be constituted by only one or by several elements. In the case of such coupling component the actuator mounting will have a shape generally corresponding to an isosceles trapezoid.

In an embodiment in which the first ends of the first and second legs are connected and separated by a coupling component which is coupled to the casing, it is further preferred that the coupling component is or comprises a gimbal by which the first ends of the first and second legs are connected to the casing. This ensured that no angular moments are transferred to the first and second legs.

In a preferred embodiment the linear actuating mechanism is a linear hydraulic, pneumatic or electrical actuator.

In a preferred embodiment the rotation axis is oriented along the longitudinal axis or in the flight direction of the aircraft. In that case, the door will be provided in a lateral skin portion of the fuselage of the aircraft.

In a preferred embodiment the two spaced elements of the primary structure of the aircraft are two parallel and spaced cross beams, in particular two parallel cross beams which extending perpendicularly to the longitudinal axis or flight direction of the aircraft.

In the present application the term "door" is understood broadly, so that the door may be, e.g., an access panel, cargo door, flap or gate.

An advantageous aircraft may include a door arrangement constructed in accordance with the above considerations.

BRIEF DESCRIPTION OF THE DRAWINGS

In the following preferred embodiments of the invention will be explained in more detail with reference to the Figures.

DETAILED DESCRIPTION

Figure 1:
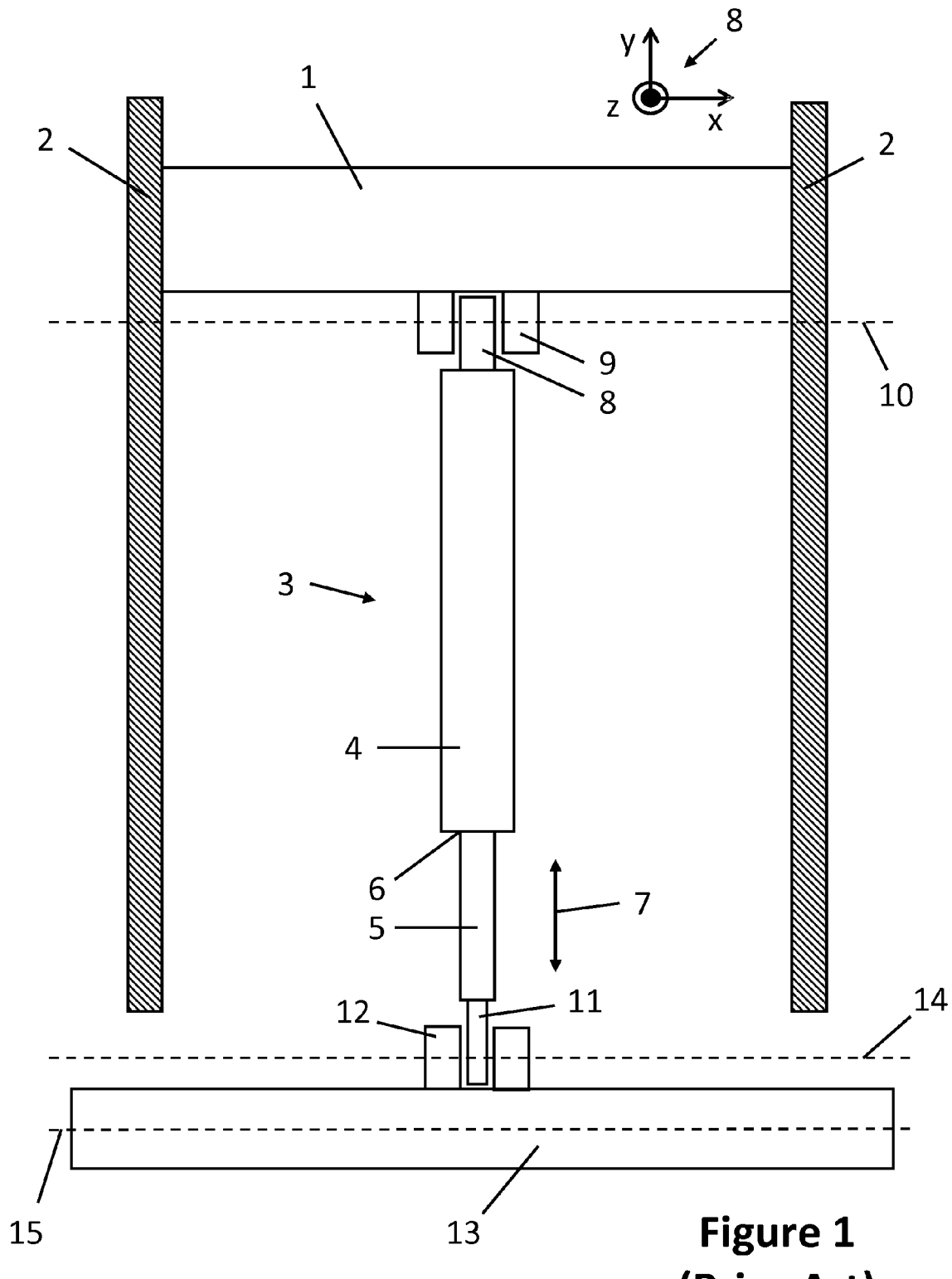
FIG. 1 schematically shows a prior art aircraft door arrangement including an actuator mounting comprising an actuator fitting or beam.

In the Figures the same or similar elements are designated by the same reference numerals.

Figure 2:
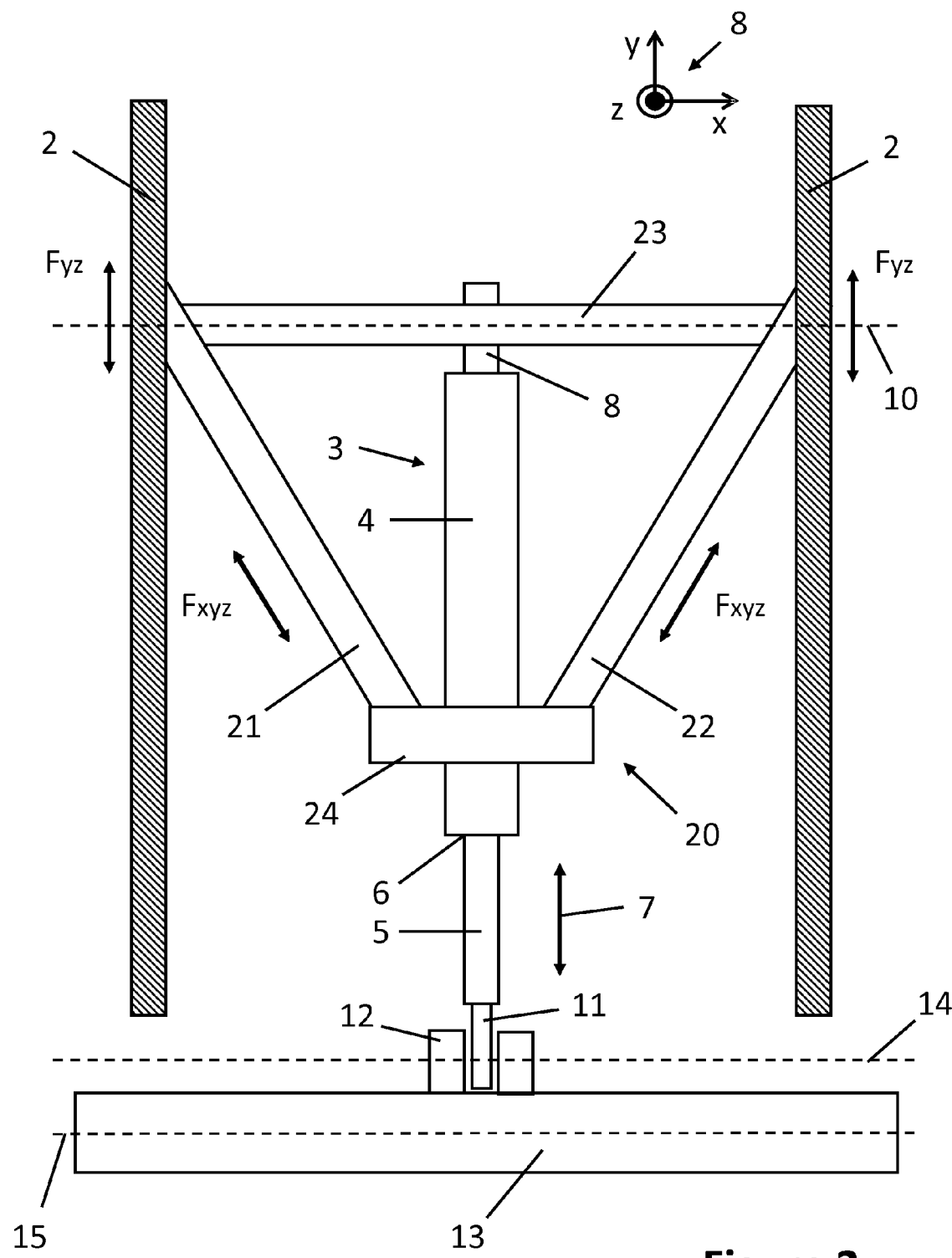
FIG. 2 schematically shows an embodiment of the aircraft door arrangement according to the invention.

Thus, in FIG. 2 a linear actuator 3 comprises a casing 4 and a rod 5 extending from the longitudinal end 6 of the casing 4 and is disposed in the middle between two cross beams 2 of the primary aircraft structure. Using suitable operation (not shown), such as hydraulic or pneumatic operation, the rod 5 can be further extended from or retracted again into the casing 4 in the longitudinal direction of the casing 4 and the rod 5, i.e. in the direction of the arrow 7 oriented along the y direction defined by the coordinate system 8.

An end portion 8 of the casing 4 is supported in a bore provided through a straight elongate bar or leg 23 in the middle of the leg 23 and in the middle between the cross beams 2, such that the end portion 8 is supported against movement in the x direction, but is allowed to move in the y direction and, at least to some extent, in the z direction. On the other hand, an eye 11 provided at the end of the rod 5 remote from the casing 4 is coupled to a bearing 12 rigidly attached to the door 13, such that the door 13 and the rod 5 are able to pivot with respect to each other about the rotation axis 14.

The leg 23 is part of a rigid mounting component 20 which further comprises to straight, elongate legs 21, 22 of identical length and shape and a coupling component 24. The legs 21 and 22 are rigidly attached with one of their longitudinal ends to the coupling component 24, and are coupled with their opposite longitudinal ends to a respective one of the cross beams 2. Further, the leg 23 is rigidly connected between the two longitudinal ends of the legs 21 and 22 coupled to the cross beams 2. The coupling between these ends of the legs 21 and 22 and the cross beams 2 is such that, by suitable rotational bearings (not specifically shown), the ends and, thus, the entire mounting component 20 are rotatable about a rotation axis 10 defined by the coupling. The rotation axis 10 is parallel to the rotation axis 14. The legs 21, 22 and 23 and the coupling component 24 extend in a common plane in which also the casing 4 extends. It should be noted that the coordinate system 8 rotates together with the mounting component 20 such that the common plane is the xy plane of the coordinate system 8.

As can be seen in FIG. 2, the legs 21 and 22 extend, on opposite sides of the casing 4, from the coupling component 24 away from the casing 4 and the door 13 at an angle in a direction inclined with respect to the longitudinal axis of the casing and the rod 5. The coupling component 24 includes a gimbal (not visible in FIG. 2) which supports the casing 4 in such a manner that loads acting in the x, y and z directions are transferred from the casing 4 to the coupling component 24 and to the legs 21 and 22, but no torsional loads about the longitudinal axis of the casing 4.

In FIG. 2 the door 13 is again shown in its closed position, in which the door 13 extends perpendicularly to the plane of the drawing. By extending the rod 5, the door 13 can be pivoted about the rotation axis 15, which is parallel to both the rotation axis 10 and the rotations axis 14, into the open position (not shown). In this process, the door 13 and the rod 5 pivot with respect to each other about the rotation axis 14, and the mounting component 20, together with the casing 4, pivots about the rotation axis 10 with respect to the cross beams 2.

The actuating loads acting upon opening and closing the door 13 are transferred as forces $F_{xyz}$ (see the corresponding arrows in FIG. 2) by the legs 21 and 22 towards the coupling of these legs to the cross beams 2. Due to the symmetric arrangement of the legs 21 and 22, the force components in the x direction are cancelled, so that only shear forces $F_{yz}$ acting in the y and/or z direction are transferred to the cross beams 2. Such shear forces can be efficiently absorbed by the cross beams 2, which advantageously do not have to absorb torsional or bending loads.

Figure 3:
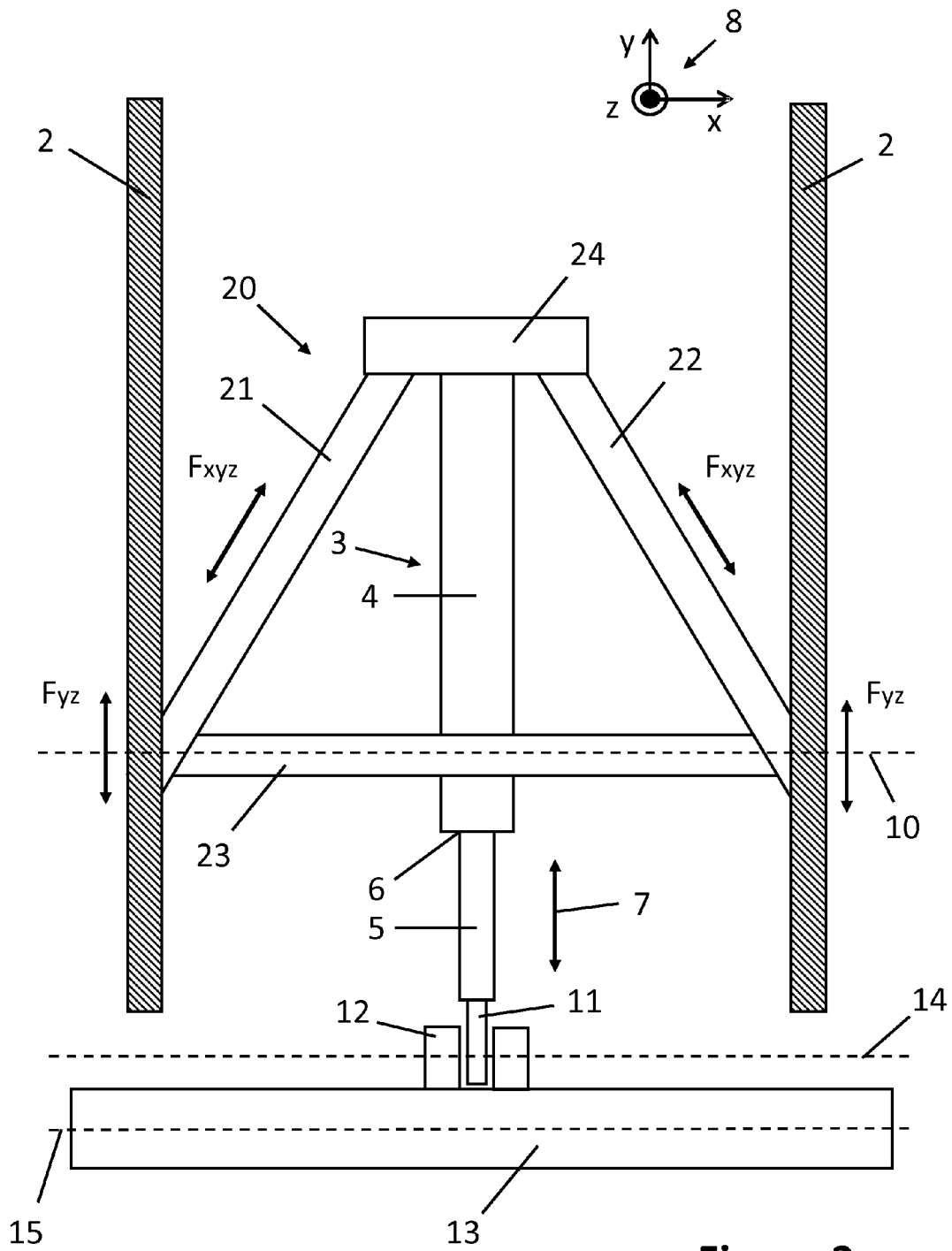
FIG. 3 schematically shows a further embodiment of the aircraft door arrangement according to the invention.

FIG. 3 shows an alternative embodiment which is distinguished from the embodiment shown in FIG. 2 only in that the mounting component 20 has been rotated by 180° in the plane defined by the drawing. Thus, the coupling component 24 supports the casing 4 in the same manner as in the embodiment of FIG. 4, but is arranged at the longitudinal end of the casing 4 remote from the door 13. Consequently, the legs 21 and 22 again extend on opposite sides of the casing 4 from the coupling component 24 away from the casing 4 at an angle in a direction inclined with respect to the longitudinal axis of the casing and the rod 5, but in this case extend towards the door 13.

The operation of the door arrangement and the transfer of loads and forces upon opening and closing the door from the casing 4 to the cross beams 2 corresponds to the embodiment of FIG. 2.

The invention claimed is:

1. An aircraft door arrangement comprising
   a door hingedly mounted to the fuselage of an aircraft such that it is selectively pivotally movable into a closed position in which it closes an aperture in the fuselage and into an open position in which it provides access through the aperture,
   a linear actuating mechanism adapted to be operable for selectively moving the door between its open and closed positions, wherein the linear actuating mechanism comprises an elongate straight casing and a rod which is disposed in the casing and extends partially from a longitudinal end of the casing and which is selectively extendable and retractable by operating the linear actuating mechanism, and
   the casing being mounted by an actuator mounting between and supported by two spaced elements of the primary structure of the aircraft such that it is pivotable about a rotation axis,
   wherein the longitudinal end of the rod extending from the casing is pivotally coupled to the door, such that upon extending the rod from the casing the door is moved into its open position and upon retracting the rod into the casing the door is moved into its closed position,
   the actuator mounting comprising a rigid mounting component comprising three elongate legs extending in a common plane together with the casing and the rotation axis and each having a first and a second longitudinal end, wherein the three elongate legs include a first leg and a second leg of equal length and shape and a third leg, and wherein
      each of the first and second legs is connected with its respective first end to the casing such that the first leg and the second leg symmetrically extend at an angle away from the casing at opposite sides thereof, and that loads acting on the casing upon operating the linear actuating mechanism are transferred to and along the first and second legs,
      the first end of the third leg is connected to the second end of the first leg and the second end of the third leg is connected to the second end of the second leg such that the third leg is connected between the second ends of the first and second legs, and
      each of the second ends of the first and second legs is rotatably coupled on the rotation axis to another one of the spaced elements of the primary structure of the aircraft such that the mounting component is pivotable about the rotation axis.

2. The aircraft door arrangement according to claim 1, wherein the third leg supports the casing at a location spaced from the location at which the first ends of the first and second ends are connected to the casing, wherein the third leg is rigidly connected to the casing or wherein the third leg and the casing are floatingly connected such that they are movable with respect to each other in the longitudinal direction of the casing.

3. The aircraft door arrangement according to claim 1, wherein the casing is connected to the third leg such that the third leg supports the casing against movement in the direction of the rotation axis.

4. The aircraft door arrangement according to claim 2, wherein the casing is connected to the third leg in the middle between the first and second ends thereof.

5. The aircraft door arrangement according to claim 1, wherein the mounting component has mirror symmetry about a plane extending through the longitudinal axis of the casing and perpendicularly to the plane defined by the mounting component.

6. The aircraft door arrangement according to claim 1, wherein the first and second legs are straight or curved, and/or wherein the third leg is straight or curved.

7. The aircraft door arrangement according to claim 1, wherein the first ends of the first and second legs are rigidly connected to the casing.

8. The aircraft door arrangement according to claim 7, wherein the first and second legs are integrally formed in one piece with the casing, and/or the third leg is integrally formed in one piece with the casing.

9. The aircraft door arrangement according to claim 1, wherein the first ends of the first and second legs are connected and separated by a coupling component which is coupled to the casing.

10. The aircraft door arrangement according to claim 1, the first ends of the first and second legs are connected and separated by a coupling component which is coupled to the casing, and wherein the coupling component is or comprises a gimbal by which the first ends of the first and second legs are connected to the casing.

11. The aircraft door arrangement according to claim 1, wherein the linear actuating mechanism is a linear hydraulic, pneumatic or electrical actuator.

12. The aircraft door arrangement according to claim 1, wherein the rotation axis is oriented along the longitudinal axis of the aircraft.

13. The aircraft door arrangement according to claim 1, wherein the two spaced elements of the primary structure of the aircraft are two parallel cross beams.

14. The aircraft door arrangement according to claim 1, wherein the door is an access panel, flap, cargo door or gate.

15. An aircraft comprising an aircraft door arrangement according to claim 1.

* * * * *